(12) United States Patent
Kim et al.

(10) Patent No.: US 12,710,224 B2
(45) Date of Patent: Aug. 18, 2026

(54) REFRIGERATOR FOR MANAGING PRODUCT STOCK AND METHOD THEREFOR

(71) Applicant: LG ELECTRONICS INC., Seoul (KR)

(72) Inventors: Jaehong Kim, Seoul (KR); Kamin Lee, Seoul (KR); Hangil Jeong, Seoul (KR); Hyoeun Kim, Seoul (KR); Heeyeon Choi, Seoul (KR); Hyejeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 18/578,046

(22) PCT Filed: Jul. 27, 2021

(86) PCT No.: PCT/KR2021/009715
§ 371 (c)(1),
(2) Date: Jan. 10, 2024

(87) PCT Pub. No.: WO2023/008595
PCT Pub. Date: Feb. 2, 2023

(65) Prior Publication Data
US 2024/0328709 A1 Oct. 3, 2024

(51) Int. Cl.
*G06Q 10/0875* (2023.01)
*F25D 29/00* (2006.01)

(52) U.S. Cl.
CPC ......... *F25D 29/00* (2013.01); *G06Q 10/0875* (2013.01); *F25D 2500/06* (2013.01); *F25D 2700/06* (2013.01)

(58) Field of Classification Search
CPC ... G06Q 30/0201; G06F 18/2148; F25B 1/10; F25B 49/005
USPC .............................................. 700/29; 348/46
See application file for complete search history.

(56) References Cited

U.S. PATENT DOCUMENTS

| | | | | |
|---|---|---|---|---|
| 10,365,034 | B2 * | 7/2019 | Kang | F25D 29/00 |
| 11,521,391 | B2 * | 12/2022 | Kim | G06F 18/2148 |
| 11,852,405 | B2 * | 12/2023 | Uchida | G06V 10/75 |
| 2015/0049170 | A1 * | 2/2015 | Kapadia | G06T 17/00 348/46 |

(Continued)

FOREIGN PATENT DOCUMENTS

| | | |
|---|---|---|
| JP | 2019-70475 A | 5/2019 |
| JP | 2019-168134 A | 10/2019 |

(Continued)

OTHER PUBLICATIONS

International Search Report (PCT/ISA/210) issued in PCT/KR2021/009715 mailed on Apr. 26, 2022.

*Primary Examiner* — Olusegun Goyea
(74) *Attorney, Agent, or Firm* — Birch, Stewart, Kolasch & Birch, LLP

(57) ABSTRACT

Discussed herein is a method of managing product reception/release data of a refrigerator including obtaining internal image data of the refrigerator using a camera provided in the refrigerator, extracting high-reliability data from the internal image data of the refrigerator, updating product reception/release data based on the high-reliability data, and creating a user database based on the updated product reception/release data.

16 Claims, 15 Drawing Sheets

(56) References Cited

U.S. PATENT DOCUMENTS

| | | | | |
|---|---|---|---|---|
| 2017/0322182 | A1* | 11/2017 | Zheng | G01N 27/83 |
| 2017/0337425 | A1* | 11/2017 | Lee | G06V 20/52 |
| 2019/0384990 | A1* | 12/2019 | Kim | H04L 67/10 |
| 2020/0033052 | A1* | 1/2020 | Maeng | G06N 20/00 |
| 2021/0041159 | A1* | 2/2021 | Uchida | F25D 11/02 |
| 2021/0364226 | A1* | 11/2021 | Park | G06N 3/09 |
| 2022/0003493 | A1* | 1/2022 | Park | G06N 3/0464 |
| 2023/0259111 | A1* | 8/2023 | Nishizaki | F25B 1/10 700/29 |

FOREIGN PATENT DOCUMENTS

| | | | |
|---|---|---|---|
| KR | 10-1754372 | B1 | 7/2017 |
| KR | 10-2020-0003299 | A | 1/2020 |
| KR | 10-2020-0051283 | A | 5/2020 |

* cited by examiner

FINAL RECEPTION/RELEASE DATA

| TIME | Predicted product | INVENTORY AMOUNT | INVENTORY CHANGE AMOUNT |
|---|---|---|---|
| $t_1$ | BEER | 2 | +2 |
| | COLA | 1 | +1 |
| | WATER | 1 | +1 |
| | SOY MILK | 1 | +1 |
| $t_2$ ,$t_3$ ,$t_4$ | BEER | 2 | 0 |
| | COLA | 1 | 0 |
| | WATER | 1 | 0 |
| | SOY MILK | 3 | +2 |
| $t_5$ ,$t_6$ | BEER | 2 | 0 |
| | COLA | 1 | 0 |
| | WATER | 1 | 0 |
| | SOY MILK | 2 | -1 |
| $t_7$ | BEER | 1 | -1 |
| | COLA | 0 | -1 |
| | WATER | 1 | 0 |
| | SOY MILK | 2 | 0 |

1200

1201

1202

1203

1204

REFRIGERATOR FOR MANAGING PRODUCT STOCK AND METHOD THEREFOR

CROSS REFERENCE TO RELATED APPLICATIONS

This application is the National Stage filing under 35 U.S.C. 371 of International Application No. PCT/KR2021/009715, filed on Jul. 27, 2021, the contents which is hereby expressly incorporated by reference into the present application.

TECHNICAL FIELD

The present disclosure relates to a refrigerator for managing a product inventory and, more particularly, to a refrigerator for determining a product inventory based on an image recognition result.

BACKGROUND ART

In general, refrigerators are used to prevent and delay product spoilage through product storage and management. As refrigerators become more common in homes and the type and number of products stored in refrigerators becomes more diverse, it also becomes necessary to determine the inventory of products stored in the refrigerators.

Recently, as various IoT devices such as mobile terminals have been interconnected, it has become possible to know the products stored in the refrigerator even without opening/closing a refrigerator door, and the inventory of stored products may be observed through other IoT devices.

Meanwhile, in order to accurately determine the inventory of the stored products, there have been frequent cases where products are received or released in the storage state of the current product. Even if the inside of the refrigerator is photographed using a camera installed in the refrigerator, since it is not possible to distinguish image data capable of accurately determining the reception and release of products, a problem arose in which it was not possible to accurately identify product reception and release.

INVENTION

Technical Problem

An object of the present disclosure is to extract refined image data from data for determining reception/release information of products stored in a refrigerator.

An object of the present disclosure is to update product reception/release data based on the refined image data.

An object of the present disclosure is to create a refrigerator product database using updated reception/release data.

An object of the present disclosure is to provide user-customized consumption services using the created database.

Technical Solution

A method of managing product reception/release data of a refrigerator according to an embodiment of the present disclosure may include obtaining internal image data of the refrigerator using a camera provided in the refrigerator, extracting high-reliability data from the internal image data of the refrigerator, updating product reception/release data based on the high-reliability data and creating a user database based on the updated product reception/release data.

The obtaining the internal image data of the refrigerator using the camera provided in the refrigerator may include obtaining the internal image data of the refrigerator using the camera when a shooting command is received from an external device or a refrigerator door is opened or closed.

The extracting the high-reliability data from the internal image data of the refrigerator may include at least one of removing low-quality data from the internal image data of the refrigerator, removing low confidence data or removing product covering data.

The low-quality data may include image data obtained when a value of at least one of a speed sensor of the refrigerator, an illuminance sensor of the refrigerator or a degree of blur of the internal image data of the refrigerator exceeds a preset criterion.

The removing the low confidence data may include determining that it is low confidence data when a similarity of a recognized product is lower than a preset value through comparison with existing data.

The removing the product covering data may include detecting a new product, extracting intersection region information of the new product and an existing product, and if the intersection region information is larger than a preset value, maintaining a reception status of the existing product and determining that the new product is received when a size of the new product is larger than that of the existing product.

The removing the product covering data may include detecting a new product region, extracting intersection region information of the new product region and an existing product region, and if the intersection region information is larger than a preset value, determining reception/release of the existing product using a similarity between a region other than the intersection region of the existing product region and a region corresponding to a region other than the intersection region of the existing product region before the new product is received, when a size of the new product region is smaller than that of the existing product region.

The determining the reception/release of the existing product using the similarity may include maintaining the reception status of the existing product when the similarity is larger than a preset value, and determining that the existing product is released when the similarity is equal to or less than the preset value.

The removing the product covering data may include detecting a new product, extracting an intersection region of the new product and an existing product, and excluding it from the product covering data when the intersection region information is equal to or less than the preset value.

The method may further include generating final product reception/release data by removing temporary reception/release data from the updated product reception/release data.

The generating the final product reception/release data by removing the temporary reception/release data of the updated product reception/release data may include generating a product list included in images taken at at least one specific time using high-reliability data and shooting time information, grouping the product list at the specific time into a certain period, generating reception/release data using the grouped product list, and correcting the generated reception/release data.

The correcting the generated reception/release data may include maintaining a product list and inventory list at a current time the same as before or after the current time, when product list and inventory information before the current time and product list and inventory information after the current time are the same.

The correcting the generated reception/release data may further include determining whether the product is included in a temporary reception/release product list.

The method may include generating an inventory list change amount of a product, an average of product change amounts and product consumption information using the user database and providing user-customized shopping using the generated information.

A refrigerator according to an embodiment of the present disclosure may include a communication unit, a memory configured to store reception/release data, a camera configured to obtain internal image data of the refrigerator and a processor configured to extract high-reliability data from the internal image data of the refrigerator, update product reception/release data based on the high-reliability data and create a user database based on the updated product reception/release data.

The processor may communicate with an external device through the communication unit and obtain the internal image data of the refrigerator using the camera when a shooting command is received from the external device or a refrigerator door is opened or closed.

The processor may extract the high-reliability data by performing at least one of removing low-quality data from the internal image data of the refrigerator, removing low confidence data or removing product covering data.

The processor may generate final product reception/release data by removing temporary reception/release data from the updated product reception/release data.

A product reception/release management system according to an embodiment of the present disclosure may include a server communicating with a refrigerator, the refrigerator may include a communication unit, a memory configured to store reception/release data, a camera configured to obtain internal image data of the refrigerator; and a processor, the server may include a communication unit configured to communicate with the refrigerator and a processor configured to obtain the internal image data of the refrigerator through the communication unit and create a user database, and the processor of the server is configured to extract high-reliability data from the internal image data of the refrigerator, update product reception/release data based on the high-reliability data and create a refrigerator reception/release database based on the updated product reception/release data.

The processor of the server may perform at least one of removing low-quality data from the internal image data of the refrigerator, removing low confidence data or removing product covering data to extract the high-reliability data, update product reception/release data based on the high-reliability data and remove temporary reception/release data from the updated product reception/release data to generate final product reception/release data.

Effect of the Invention

According to an embodiment of the present disclosure, accurate product reception/release data for updating product reception/release data can be generated by extracting refined image data with high reliability from data for determining reception/release information of products stored in a refrigerator.

According to an embodiment of the present disclosure, an accurate product reception/release database can be created by distinguishing products that are temporarily received and released in and from a refrigerator and not reflecting them in product reception/release data.

According to an embodiment of the present disclosure, by securing accurate product reception/release data, customized services can be provided by identifying user consumption patterns using the reception/release data.

According to an embodiment of the present disclosure, by creating a refrigerator product database using updated reception/release data, a user-customized consumption service can be provided using the created database.

According to an embodiment of the present disclosure, convenience can be provided to users by providing user-customized consumption services.

DESCRIPTION OF DRAWINGS

FIG. 6 is a flowchart according to an embodiment of the present disclosure.

FIG. 7 is a flowchart according to an embodiment of the present disclosure.

FIG. 12 is a diagram illustrating a database creation process according to an embodiment of the present disclosure.

BEST MODE

Figure 1:
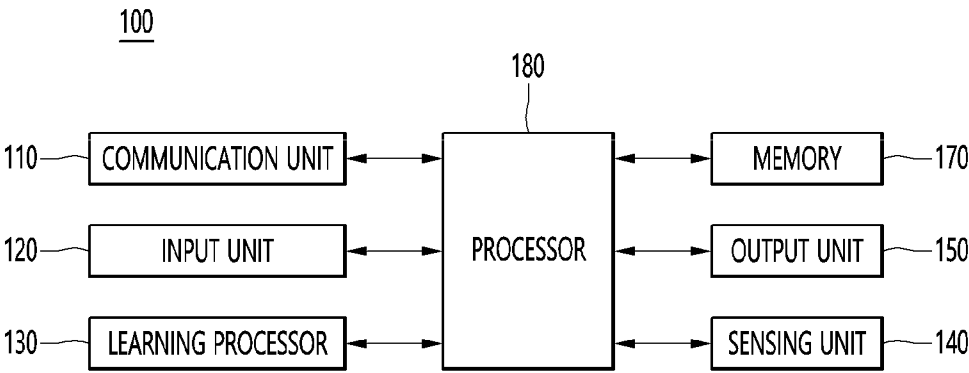
FIG. 1 shows an artificial intelligence device 100 according to an embodiment of the present disclosure.

Hereinafter, the present invention will be described in detail.

The embodiment described below is only an example of the present invention, and the present invention may be modified in various forms. Accordingly, the specific features and functions disclosed below do not limit the scope of the claims.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as “module” or “unit” may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component.

When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Figure 2:
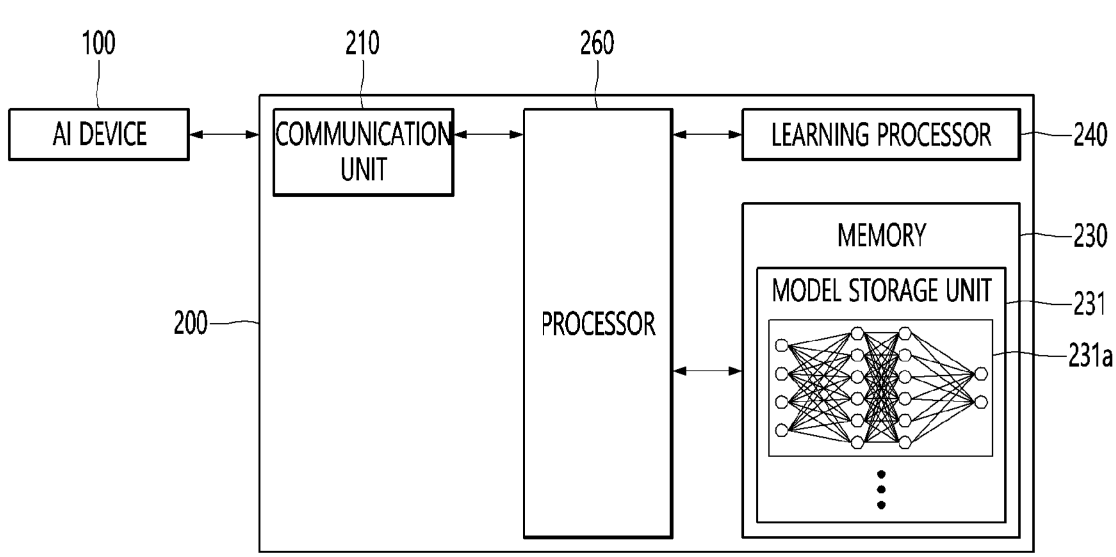
FIG. 2 shows an artificial intelligence server 200 according to an embodiment of the present disclosure.

At this time, the learning processor 130 may perform AI processing together with the learning processor 240 of the AI server 200 of FIG. 2.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network/The AI server 200 may include a plurality of servers to perform distributed processing or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
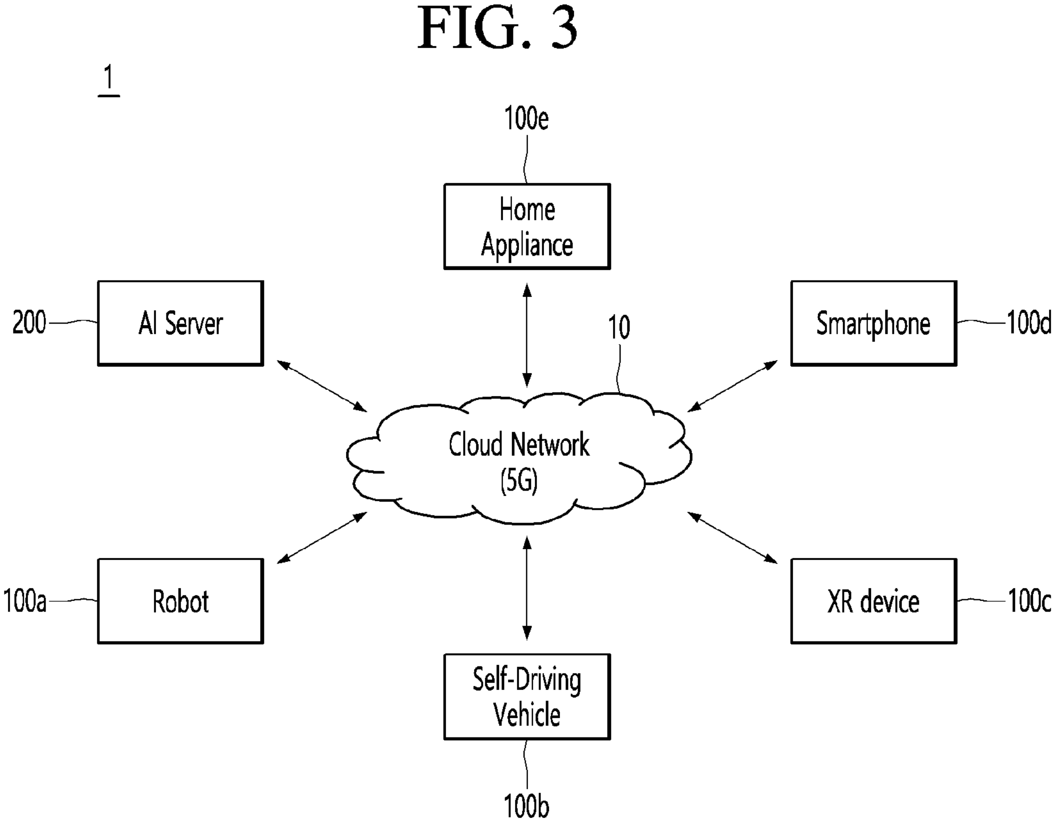
FIG. 3 shows an artificial intelligence system 1 according to an embodiment of the present disclosure.

FIG. 3 is a view of an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the accommodated input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model provided as at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be accommodated to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the path and the travel plan, or may determine the operation.

Like the robot 100*a*, the self-driving vehicle 100*b* may use the sensor information acquired from at least one sensor among the lidar, the radar, and the camera so as to determine the travel path and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

In this case, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel path and the travel plan, and may control the driving device such that the self-driving vehicle 100*b* travels along the determined travel path and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving device based on the control/interaction of the user. In this case, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

In this case, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot subjected to control/interaction in an XR image. In this case, the robot 100*a* may be separated from the XR device 100*c* and interwork with each other.

If the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
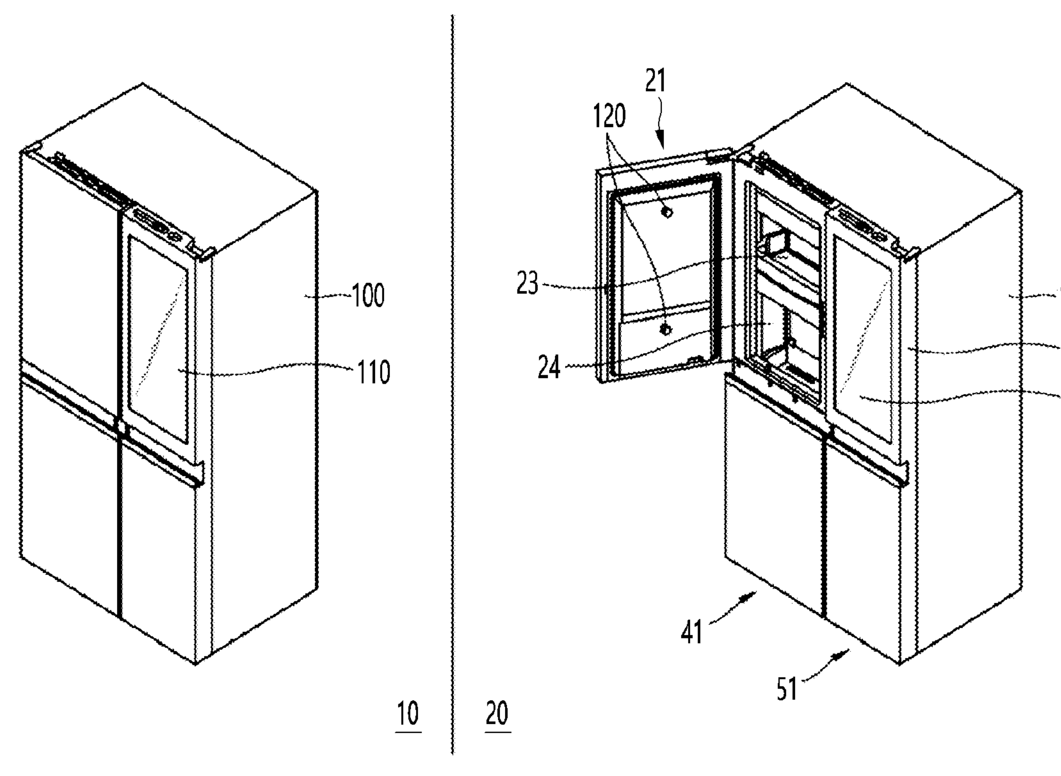
FIG. 4 shows a refrigerator according to an embodiment of the present disclosure.

FIG. 4 shows a refrigerator according to an embodiment of the present disclosure.

A repeated description of FIG. 1 will be omitted.

In the present disclosure, the artificial intelligence device 100 may be a refrigerator and includes an edge device.

Therefore, in this specification, a refrigerator will be focused upon as a device for refrigerating or freezing stored items, and includes all devices that mainly perform various refrigerating and freezing functions, such as refrigerators for storing ordinary food, kimchi refrigerators, beverage refrigerators, household refrigerators, commercial refrigerators, and freezing devices consisting only of freezers.

In addition, it is applied to devices that refrigerate stored items other than food, such as cosmetic refrigerators, and refrigeration devices that are not fixed but mobile, and are, for example, installed in a large refrigerated trailer are also included in the embodiments mentioned in this specification.

FIG. 4 is a diagram showing a refrigerator that identifies stored products to which an embodiment of the present invention is applied. 10 is the appearance of the refrigerator 100 in a closed state, and 20 is the appearance of the refrigerator 100 in an open state. A space, the opening and closing of which is managed by one 21 of a plurality of doors 21, 31, 41, and 51 constituting the refrigerator 100, may be divided into a number of separate storage spaces 23 and 24, and the temperature of each of the storage spaces 23 and 24 may be independently controlled. Of course, the temperature may be controlled equally for spaces opened and closed by one door.

In addition, each storage space may be divided by shelves. The refrigerator 100 may further include a display unit 150 that displays information or shows the interior of the refrigerator 100. The display unit 150 may be placed on the front surface of a specific door 31 or on a side of the refrigerator 100. The display unit 150 may include a transparent display panel that allows the interior of the refrigerator to be viewed. In addition, the display unit 150 may include a display panel that displays an internal image of the refrigerator.

Figure 5:
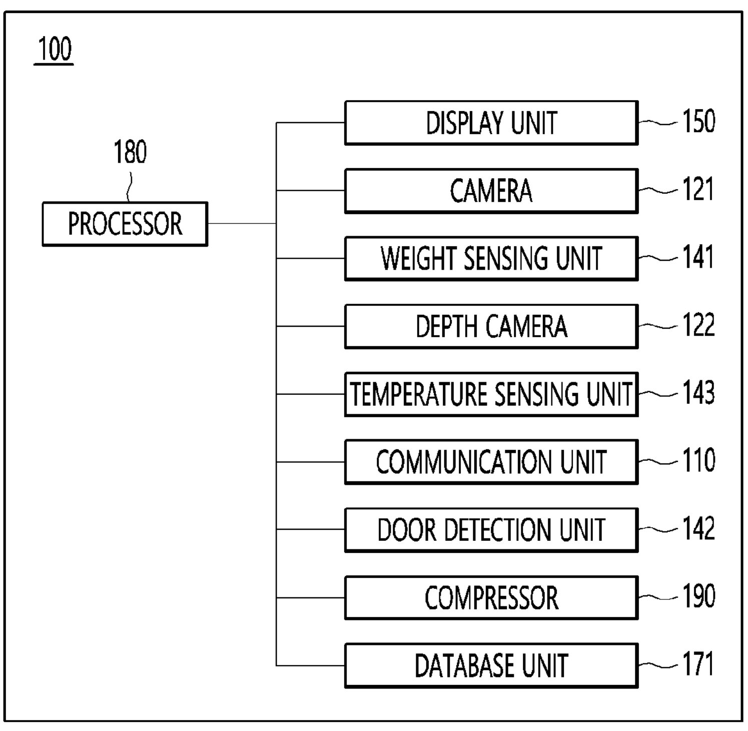
FIG. 5 shows a configuration of a refrigerator according to an embodiment of the present disclosure.

FIG. 5 shows a configuration of a refrigerator according to an embodiment of the present disclosure.

FIG. 5 is a diagram showing components of a refrigerator according to an embodiment of the present invention for providing information about products inside.

The display unit 150 provides a function of displaying images of products in a storage space or displaying descriptions of each product.

The input unit 120 of FIG. 1 may include a camera 121.

The camera 121 photographs products stored in the storage space. The storage space is photographed to identify the type and size of products being stored or received. At this time, the processor 180 may check whether the received product is a previously received product through a database unit 171.

The memory 170 of FIG. 1 may include the database unit 171.

The database unit 171 accumulates and stores images captured by the camera 121 for the received product. In this process, images taken by the camera 121 from various angles may be accumulated and stored in the database unit 171. In addition, when there are multiple cameras 121, the database unit 171 may store information on which position the camera was placed in to capture the image, or information on which storage space or which of the shelves subdividing the storage space the product was placed in or on.

The database unit 171 stores images captured by the camera 121, and the processor 180 stores images of products separated by product from the captured images. In addition, the database unit 171 stores meta information corresponding to each captured image or product image.

The meta information may include one or more of the following: the name of the product, the category of the product, the time the product was received, the expiration date of the product, the alarm time applied to the product, and the location information of the product placed in the storage space. When the name is labeled by the user, it may be used as the name.

A reception time refers to the time the product was received. The reception time may be one or more of the first reception time of the product in the refrigerator or the most recent reception time. If a product is frequently released and received from and in the refrigerator and the product is identified by the processor 180 as the same product, the time the product is released and received may be accumulated and stored.

In addition, the expiration date for use of the product or the alarm time applied to the product may also be meta information. This may be input or selected directly by the user.

The alarm time may be set to use the product. In addition, the processor 180 may also store location information where the product is placed. In this process, the accumulated location information of the product may be stored in the database unit 171 and output.

The sensing unit 140 in FIG. 1 may further include a weight sensing unit 141 that senses the weight of the product in the storage space, a temperature sensing unit 143 that senses the temperature of the storage space, and a door detection unit 142 that senses the opening/closing of the door.

The information sensed by the weight sensing unit 141 on each shelf or in each storage space is also stored in the database unit 171, so that when a positional movement occurs within the refrigerator, such as moving from a first shelf to a second shelf, the accuracy of product identification can be improved through a change in weight for each shelf.

In addition, a depth camera 122 and a temperature sensing unit 143 may be further included to increase accuracy in separating images for each product. The temperature sensing unit 143 senses temperature information of the product within the storage space, and the depth camera 122 generates depth information of the product.

A product may have the same or similar temperature. In addition, a product may have the same depth information or may have depth information that constantly increases or decreases. Accordingly, when the processor 180 extracts an image of a specific product from a captured image, accuracy can be increased by using the temperature or depth information of the product.

The processor 180 controls the above-mentioned components and may display or output product information using the information provided by each component or control the communication unit 110 to output information from an external device through communication.

In addition, the processor 180 generates meta information of each product based on the image captured by the camera 121 or information stored in the database unit 171.

The meta information may include the name, reception time, estimated weight of the product, etc. In addition, the processor 180 may also generate the expiration date for each product received by the communication unit 110.

The communication unit 110 may receive information necessary to generate the meta information of the product from an external server or transmit product information when an external smartphone, etc. requests confirmation of internal information of the refrigerator. For example, the image and meta information of the product may be transmitted to an external mobile terminal or server 200 and the search information or output method information of the product stored in the storage space may be received from the external mobile terminal or server 200.

The door detection unit 142 detects the opening and closing of the door to check the reception of the product. In this process, the door detection unit 142 may detect whether the user's body has entered the storage space at the boundary point of the storage space to check whether the user simply opens and closes the door.

In addition, the door detection unit 142 may include a speed sensor to measure the speed when the door is opened/closed.

The compressor 190 provides cooling power to a refrigerator and a freezer. When a new product is stored in the refrigerator, the compressor 190 may provide cooling power to the refrigerator based on the settings of the processor 180. In addition, when the processor 180 outputs predetermined product information to the outside and then instructs the operation of the refrigerator 100 from the outside, the compressor 190 may operate based on this.

The memory 170 of FIG. 1 may further include the database unit 171.

The database unit 171 stores images of received products. Since images taken at various angles are stored, the processor 180 may search for candidate images stored in the database unit 171 when identifying newly received products.

The processor 180 according to an embodiment of the present disclosure may obtain internal image data of the refrigerator through the camera 121, generate reception/release data of products stored inside the refrigerator using refined image data among the obtained image data, and update product reception/release information using the generated reception/release data.

In addition, the processor may generate a user database using the product reception/release and store the database in the memory 170.

Meanwhile, the following description will focus on the operation of the processor 180 of the refrigerator 100, but it is not limited thereto, and it is preferably interpreted that the server 200 communicating with the refrigerator 100 may perform the operation of the processor 180.

Figure 6:
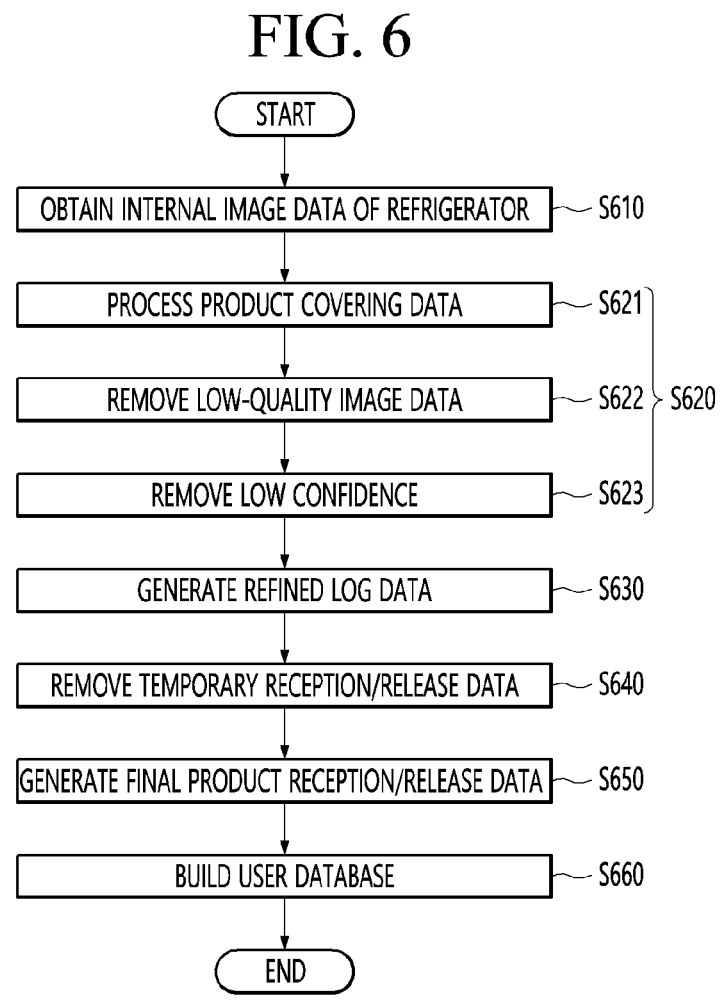

FIG. 6 is a flowchart illustrating a product reception/release management method of a refrigerator according to an embodiment of the present disclosure.

The processor 180 of the refrigerator according to the embodiment of the present disclosure may obtain internal image data of the refrigerator (S610).

Specifically, the processor 180 may detect the user's door opening using the door detection unit. When the door is opened and closed by the user, the processor 180 turns on the camera, and turns on the lights inside the refrigerator after a certain period of time, thereby obtaining the internal image data of the refrigerator.

According to another embodiment of the present disclosure, the processor 180 detects the user's door opening or closing using the door detection unit, and obtains the internal image data of the refrigerator by performing photographing using the camera when the door is opened or closed.

Meanwhile, according to an embodiment of the present disclosure, the processor 180 communicates with an external device (e.g., a mobile terminal, etc.) using the communication unit 110, and obtain the internal image data of the refrigerator by operating the camera 121, when an application for interacting with the refrigerator is executed on the mobile terminal.

The processor 180 according to the embodiment of the present disclosure may obtain product inventory information stored in the refrigerator using the internal image data of the refrigerator.

Meanwhile, in the embodiment of the present disclosure, products that may be stored in the refrigerator are collectively referred to as 'products'.

At this time, product inventory information may include the name, number, location, reception date, release date, etc. of the product being stored.

The processor 180 may extract product information from the internal image data of the refrigerator using a conventional image processing technology.

In addition, information on newly received and released products may be extracted through comparison with the previously obtained internal image data of the refrigerator.

The processor 180 according to the embodiment of the present disclosure may store the obtained product inventory data in the memory.

The processor 180 of the refrigerator according to the embodiment of the present disclosure may obtain the internal image data of the refrigerator (S610) and then remove unrecognized/misrecognized results of the internal image data of the refrigerator (S620). This may be used interchangeably with a process of extracting high-reliability data.

At this time, the high-reliability data may mean a data set obtained by removing product covering data indicating a product covered by another product, low-quality image data and low confidence data from the internal image data of the refrigerator obtained in the S610.

In other words, the step of extracting the high-reliability data from the internal image data of the refrigerator may include removing low-quality data from the internal image data of the refrigerator, removing low confidence data or removing product covering data.

Hereinafter, the above steps will be described in turn. Meanwhile, it is also possible to perform step S620 by changing the order of S621 to S623.

In order to extract the high-reliability data, the processor 180 according to the embodiment of the present disclosure may remove the product covering data indicating the product covered by another product from the internal image data of the refrigerator (S621).

Details related to S621 will be described with reference to FIG. 7.

Figure 7:
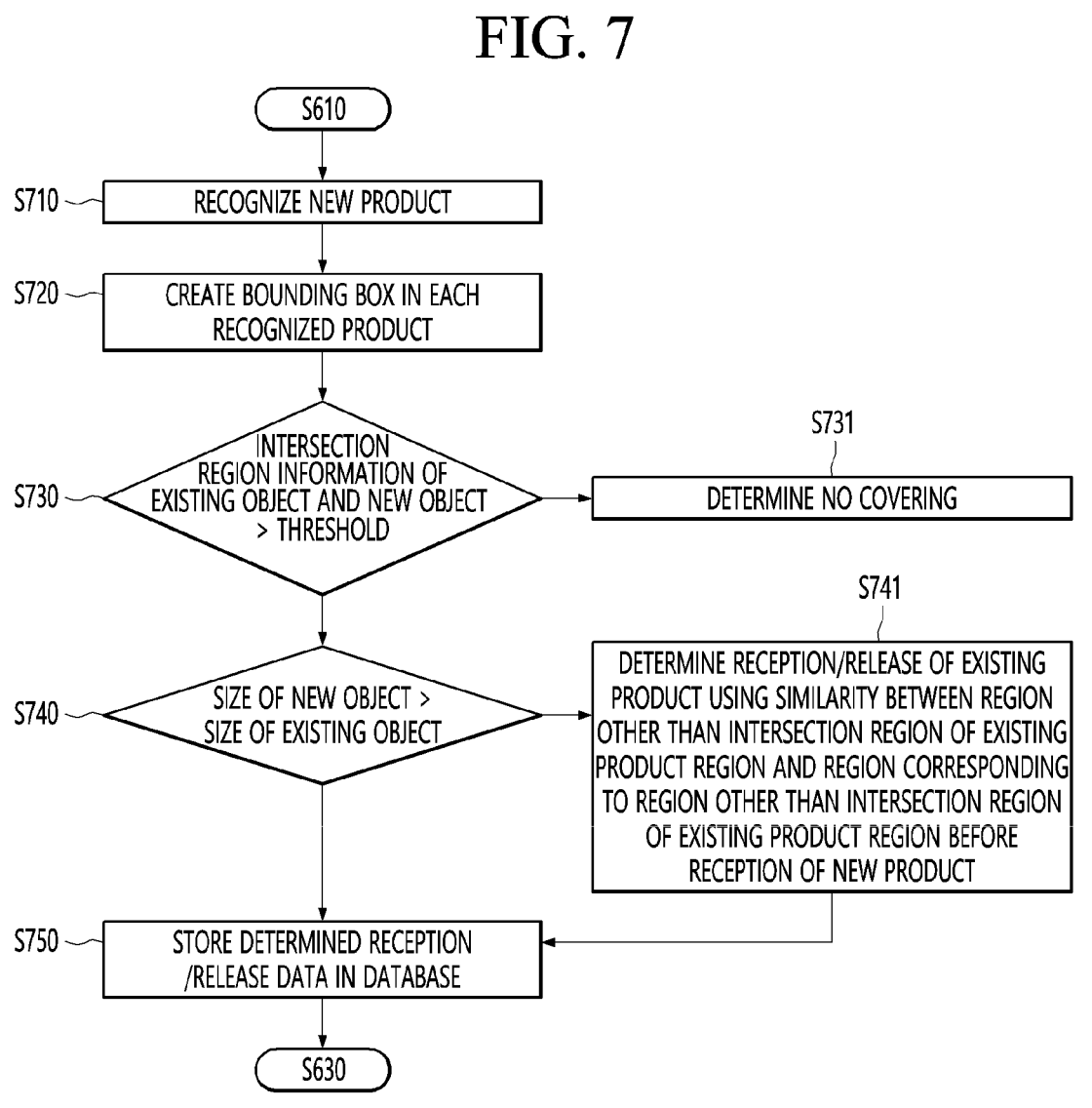

FIG. 7 is a flowchart illustrating a method of removing product covering data (S621) according to an embodiment of the present disclosure.

Referring to FIG. 7, the processor 180 of the refrigerator may recognize a new product from the obtained internal image data (S710). At this time, the new product may be a product that has been newly received in the refrigerator.

Meanwhile, when obtaining the internal image data of the refrigerator using the camera 121 provided inside the refrigerator, the camera 121 is placed at a specific location and thus products viewed from the specific location may appear to overlap each other.

As described above, conventionally, when managing inventory of products using internal image data obtained through the camera 121, products cover each other, thereby reducing the accuracy of inventory management.

The processor 180 according to the embodiment of the present disclosure recognizes a new product and, upon obtaining data about the product, may generate a bounding box in each of the regions where the existing product and the new product are respectively detected (S720).

In addition, based on the bounding boxes of the existing product and the new product, intersection region information may be generated.

At this time, the bounding box may refer to a box that extracts coordinate data of each product detected in the internal image data of the refrigerator and connects the coordinate data in vertical/horizontal directions. The shape of the bounding box is generally rectangular, but is not limited to this.

The processor 180 may compare the intersection region information of the existing product and the new product with a preset threshold (S730).

At this time, the intersection region information may mean a value proportional to the area of the region where the bounding boxes of the new and existing products overlap.

More specifically, the intersection region information may be IoU information.

At this time, IoU is an abbreviation for 'Intersection over Union' and may usually be a mathematical indicator indicating how well the positions (Bounding Boxes) of two products match.

Hereinafter, a case where it is determined to be covering data will be described.

The processor 180 of the refrigerator according to the embodiment of the present disclosure may compare the size of the new product and the size of the existing product (S740) when the intersection region information of the existing product and the new product exceeds a preset threshold (S730—YES).

Meanwhile, due to the reception of a new product, the internal image data of the refrigerator may include i) a case where the new product completely covers the existing product, or ii) a case where the new product covers part of the existing product.

First, i) the case where the new product completely covers the existing product in the internal image data of the refrigerator due to the reception of the new product will be described.

If the size of the new product is larger than the size of the existing product (S740—YES), the processor 180 of the refrigerator may determine that the new product completely covers the existing product and store the existing product in the temporary database until the location of the new product is changed (S750).

At this time, the size of the new product being larger than the size of the existing product may mean that the size of the new product obtained from the internal image data of the refrigerator is larger than the size of the existing product.

In other words, the size of the bounding box of the new product may be larger than the size of the bounding box of the existing product.

In other words, since the new product completely covering the existing product means that the bounding box of the new product detected in the internal image data of the refrigerator completely covers the bounding box of the existing product, the size of the bounding box of the new product is larger than that of the bounding box of the existing product.

At this time, if it is determined only by the internal image data of the refrigerator, even though the existing product is not detected because it is actually covered by the new product, the processor 180 recognizes that the existing product is released and determine that the new product is received, so that errors may occur.

To solve the above problem, the processor 180 of the refrigerator of the present disclosure may store data related to the existing product in the memory or the temporary database.

For example, the processor 180 may generate product reception/release data that maintains the reception status of the existing product and determines reception of the new product.

In addition, the processor 180 may perform product reception/release data update, which will be described later.

Meanwhile, if the size of the new product is smaller than the size of the existing product (S740—NO), the processor 180 according to the embodiment of the present disclosure may determine the reception/release of the existing product using similarity between a region other than the intersection region of the existing product region and a region corresponding to the region other than the intersection region of the existing product region before reception of the new product (S741).

The processor 180 may maintain the reception status of the existing object when the similarity is greater than a preset value, and may determine the release status of the existing object when the similarity is less than or equal to the preset value.

The processor 180 may store the reception/release data determined in the above process in a database (S750).

Hereinafter, an example of a method of removing covering data according to an embodiment of the present disclosure will be described with reference to FIGS. 8 and 9.

Figure 8:
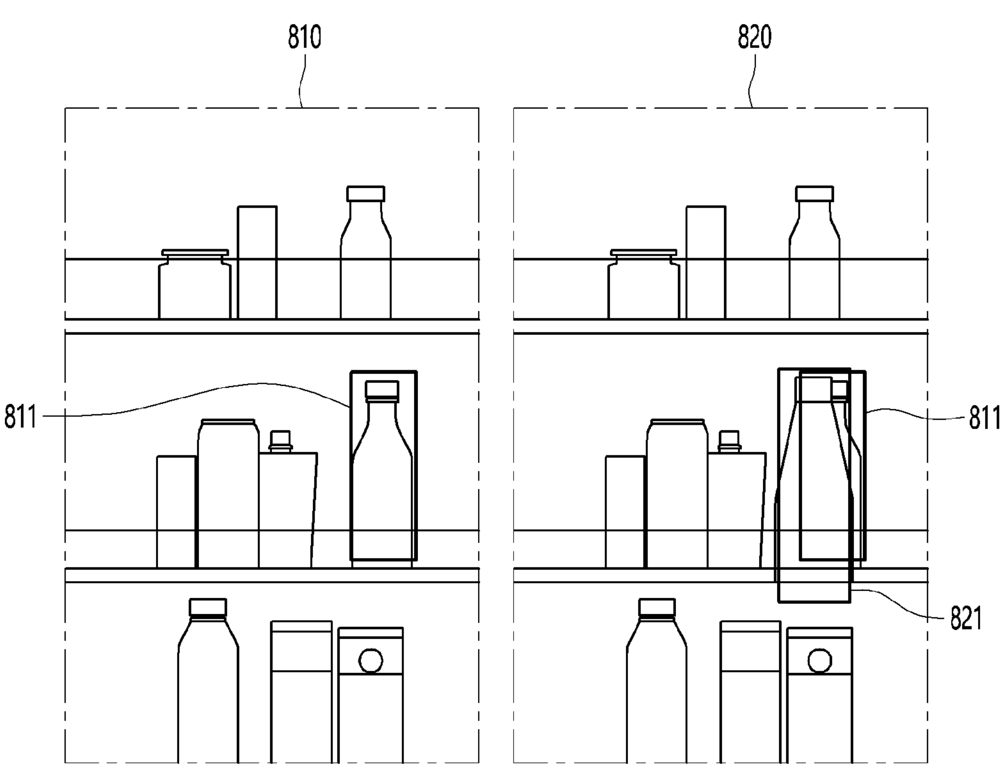
FIG. 8 is a diagram illustrating covering data processing according to an embodiment of the present disclosure.

FIG. 8 is a diagram illustrating i) the case where the new product completely covers the existing product according to an embodiment of the present disclosure.

Referring to FIG. 8, when the size of the new product is larger than the size of the existing product (S740—YES), the processor 180 of the refrigerator may store existing product data in the temporary database until the location of the new product is changed (S750).

For example, an existing object 811 may exist in the internal image data of the refrigerator 810 obtained at a previous time. Afterwards, a new product 821 may be included in internal image data 820 of the refrigerator obtained at a current time.

The processor 180 according to the embodiment of the present disclosure may generate bounding boxes for the existing object 811 and the new object 821.

In addition, if the intersection region information of the bounding box exceeds a preset threshold, it may be determined that the two objects overlap.

Hereinafter, it is assumed that the objects overlap.

The processor 180 according to the embodiment of the present disclosure may compare the size of the bounding box of the existing product 811 and the size of the bounding box of the new product 821.

In FIG. 8, the size of the bounding box of the new product may be larger than the size of the bounding box of the existing product.

This means that the bounding box of the new product 821 detected in the internal image data 820 of the refrigerator completely covers the bounding box of the existing product 811. Therefore, the size of the bounding box of the new product is larger than the size of the bounding box of the existing product.

The processor according to the embodiment of the present disclosure may generate product reception/release data that maintains the reception status of the existing product 811 and determines reception of the new product 821.

In addition, the processor 180 may perform product reception/release data update, which will be described later.

Figure 9:
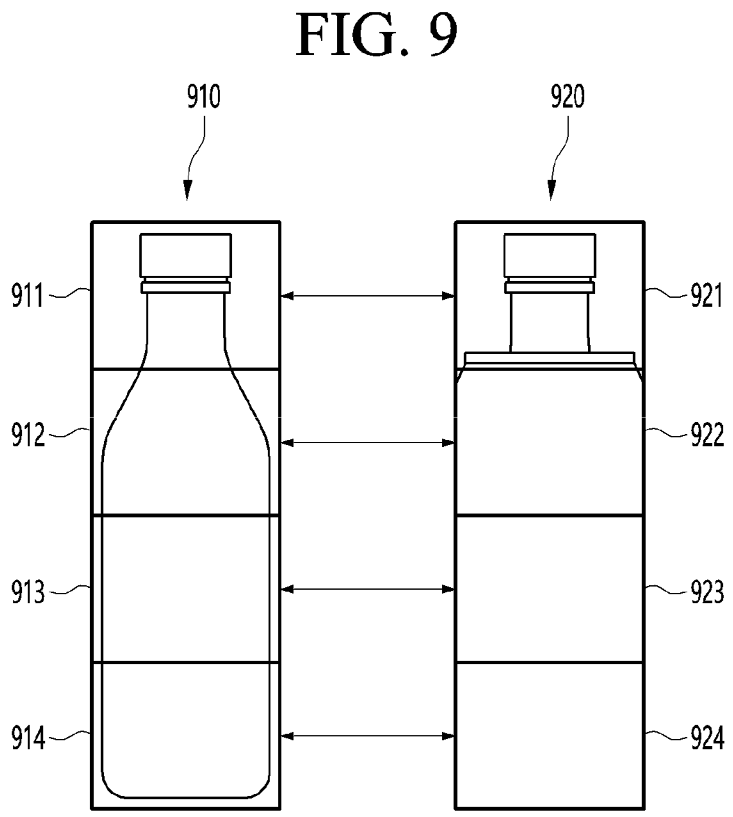
FIG. 9 is a diagram illustrating covering data processing according to an embodiment of the present disclosure.

FIG. 9 is a diagram illustrating ii) the case where the new product covers part of the existing product according to an embodiment of the present disclosure.

When the size of the new product is smaller than the size of the existing product (S740—NO), the processor 180 according to the embodiment of the present disclosure may determine reception and release of the existing product using a similarity between a region other than the intersection region of the existing product region and a region corresponding to the region other than the intersection region of the existing product region before reception of the new product (S741).

Referring to FIG. 9, in the internal image data of the refrigerator, the image data 910 of the existing product detected at a previous time and image data 920 in which the existing product and the new product overlap, which is detected at a current time, are shown.

The new product covering part of the existing product means that the bounding box of the new product detected in the internal image data of the refrigerator partially covers the bounding box of the existing product. Therefore, the size of the bounding box of the new product is smaller than the size of the bounding box of the existing product.

The processor 180 according to the embodiment of the present disclosure may determine reception/release of the existing product using a similarity between a region 921 other than intersection regions 922, 923 and 924 of the existing product region and a region 911 corresponding to the region other than the intersection regions of the existing product region 910 before reception of the new product in the image data 920 in which the existing product and the new product overlap (S741).

Specifically, the processor 180 may divide the image data 910 of the existing product detected at a previous time and the image data 920 in which the existing product and the new product overlap, which is detected at the current time, by a certain ratio.

The image of the existing product detected at the previous time may be divided by the ratio of intersection region information. (Refer to 911 to 914)

In addition, the image 920 detected at the current time may be divided by the ratio of intersection region information. (refer to 921 to 924)

The processor of the present disclosure may derive the similarity between the region 921 other than the intersection regions 922, 923 and 924 of the existing product region and the region 911 corresponding to the region other than the intersection regions of the existing product region 910 before reception of the new product.

When the similarity is higher than a preset value, the processor 180 of the present disclosure determines that the existing product has not been released and may maintain the reception of the existing product.

In addition, the processor 180 according to the embodiment of the present disclosure may determine reception of the new product. Afterwards, the processor may store the determined reception/release data in the database (S750).

FIG. 7 will be described again.

Meanwhile, the processor may determine 'no covering' when the intersection region information of the existing product and the new product is less than or equal to the preset threshold (S730—NO) (S731).

When the processor according to the embodiment of the present disclosure determines 'no covering', the internal image data of the refrigerator may be excluded from the product covering data.

Meanwhile, the data excluded from the product covering data is determined to be a high-reliability image and may be updated to the refined product reception/release data through steps S622 and S623 (S630).

FIG. 6 will be described again.

The processor 180 according to the embodiment of the present disclosure may remove low-quality image data and low confidence data during the process of removing unrecognized/misrecognized data.

First, a method of removing low-quality image data (S622) will be described.

The processor of the refrigerator according to the embodiment of the present disclosure may remove low-quality image data (S622).

At this time, the low-quality image data may include image data obtained when at least one value of the speed sensor of the door detection unit 142 of the refrigerator, the illuminance sensor of the refrigerator, or the degree of blur of the internal image data of the refrigerator exceeds a preset criterion.

Specifically, if the value measured by the speed sensor due to opening/closing of the refrigerator door exceeds a preset value, the processor 180 may determine that the data is low-quality image data.

In addition, if the value measured by the illuminance sensor of the camera installed in the refrigerator exceeds a preset value, the processor 180 may determine that the data is low-quality image data.

Alternatively, the processor 180 may measure the illuminance value of the internal image data of the refrigerator using a known illuminance value measurement algorithm, and determine that the data is low-quality image data when the illuminance value exceeds a preset value.

In addition, the processor 180 may measures the blur value of the internal image data of the refrigerator using a known blur value measurement algorithm, and determine that the data is low-quality image data when the blur value exceeds a preset value.

For example, if the user repeatedly opens and closes the door meaninglessly or runs an application to control the refrigerator using a mobile terminal connected to the refrigerator without any purpose, since reception/release of products inside the refrigerator will not occur, product reception/release data shall be determined to be useless noise data.

In addition, when the door of the refrigerator is opened/closed at a high speed, the internal image data of the refrigerator obtained using the camera installed on the refrigerator door may be low-quality data that contains insufficient ingredients to identify the characteristics of the product.

In addition, if the illuminance sensor of the camera provided in the refrigerator is not accurately controlled by the external environment, the internal image data of the refrigerator may be low-quality data.

Therefore, if the low-quality data is used, since different recognition results may be obtained for the same location and the same product, it will be necessary to remove it.

Hereinafter, a method of removing low confidence data will be described.

The processor according to the embodiment of the present disclosure may remove low confidence data from the internal image data of the refrigerator (S623).

The processor 180 according to the embodiment of the present disclosure may determine unspecified data with the recognized product classified as unspecified and low confidence data with inconsistent recognition results, remove the low confidence data, and extract refined log data from the obtained internal image data of the refrigerator.

According to the embodiment of the present disclosure, the K-Nearest Neighbor (KNN) algorithm may be used to extract low confidence data.

Specifically, a plurality of vectors for each existing product are generated using the learning data labeled with the learner and the image of the existing product, and when a new product is detected in the captured internal image data of the refrigerator, a similarity between the vector of the new product and the vector of each existing product learned in the learner may be determined.

At this time, similarity refers to a distance between vectors, and the closer the distance is, the more similar between the two products may be determined to be.

Here, the above process is performed K times, and if K results have a consistency lower than a preset value, it may be determined to be low confidence data.

Data determined to be low confidence may be removed from the internal image data of the refrigerator and not used to update product reception/release data.

According to the embodiment of the present disclosure, high reliability data for updating product reception/release data may be extracted using the refined internal image data of the refrigerator and the refined log data may be generated.

Meanwhile, after generating the refined log data, the processor according to the embodiment of the present disclosure may remove temporary reception/release data (S640).

For example, the user may have products to be temporarily taken out of the refrigerator for cooking rather than release of the products, such as seasonings, sauces (e.g., ketchup, red pepper paste, jam). This case is defined as 'temporary reception/release'.

If this temporary reception/release data is not removed, reception and release of new products may be determined. Therefore, it shall be removed using the following method.

Hereinafter, a method of removing temporary reception/release data will be described with reference to FIGS. 10 to 12.

Figure 10:
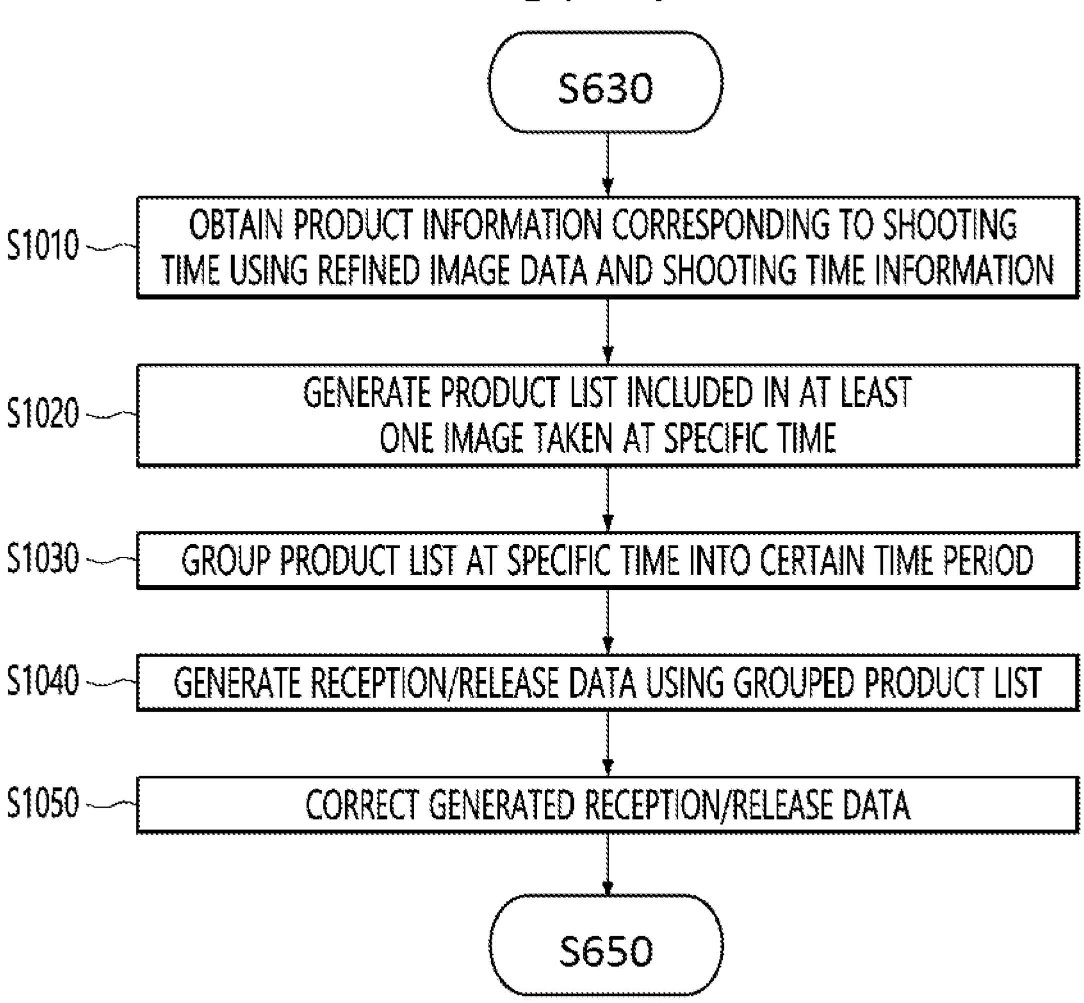
FIG. 10 is a diagram illustrating a temporary reception/release data removing method according to an embodiment of the present disclosure.

FIG. 10 is a flowchart illustrating a method of removing temporary reception/release data according to an embodiment of the present disclosure.

Referring to FIG. 10, the processor 180 according to the embodiment of the present disclosure may obtain product information corresponding to a shooting time using refined image data and shooting time information of the refined image data (S1010).

Figure 11:
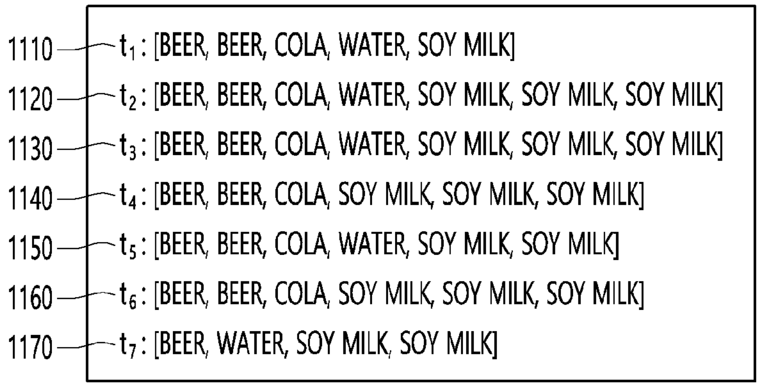
FIG. 11 is a diagram illustrating a database creation process according to an embodiment of the present disclosure.

For example, referring to FIG. 11, the processor 180 may generate the product information corresponding to the shooting time information as a product list 1100 of FIG. 11 using data stored in the memory 170 or the database 171.

The processor 180 may generate the product list included in at least one image taken at a specific point in time among the plurality of refined image data (S1020).

For example, referring to FIG. 11, the processor according to the embodiment of the present disclosure may generate the product list 1110 included in an image taken at time t1 among refined image data.

In the same manner as above, the processor 180 may generate product lists 1110 to 1170 included in images taken at times t1 to t7 among the refined image data.

Specifically, the product list 1110 included in the image taken at time t1 may be beer, beer, cola, water, and soy milk. In addition, the product list 1120 included in the image taken at time t2 may be beer, beer, cola, water, soy milk, and soy milk.

The product list 1130 included in the image taken at time t3 may be beer, beer, cola, water, soy milk, soy milk, and milk.

The same product list may be generated at t4 to t7 in the same way as above.

Meanwhile, the product list 1100 is only an example and may include various times and various products depending on settings.

The processor 180 according to the embodiment of the present disclosure may group at least one product list at a specific time into a certain time range (S1030). The processor 180 may generate reception/release data including time, recognized product, inventory amount, and inventory change amount using the grouped product list (S1040).

Thereafter, the processor 180 may correct the reception/release data generated based on the product list and inventory information before the current time and the product list and inventory information after the current time (S1050).

Specifically, if the product list and inventory information before the current time and the product list and inventory information after the current time are the same, the processor 180 may maintain the product list and inventory information at the current time the same as before or after the current time. The above process will be explained in FIG. 12 below.

The processor according to the embodiment of the present disclosure may repeat the above process in real time to generate final reception/release data (S650).

Hereinafter, detailed examples will be described with reference to FIGS. 11 and 12.

FIG. 11 shows a product list according to an embodiment of the present disclosure, and FIG. 12 is a diagram showing a process of generating final product reception/release data to be updated using the product list generated in FIG. 11.

Referring to FIG. 12, the processor 180 may group specific times in the product list 1100 generated in FIG. 11 into a certain time range. The processor 180 may generate reception/release data using the data grouped into the certain time range.

Specifically, according to the embodiment of the present disclosure, the processor 180 may group t1 to t7, which represent the shooting times of the plurality of internal image data, into the certain time range (S1030). The processor 180 may generate reception/release data 1200 including time, recognized product, inventory amount, and inventory change amount using the grouped data.

For example, if the certain time range is T time (e.g., 1 hour, etc.), the internal image data of the refrigerator at t1 may be obtained during the T time of a first period.

The T time period of a second period may include t2, t3, and t4.

The T time of a third period may include t5 and t6.

The T time of a fourth period may include t7.

The processor 180 may generate the recognized product list (beer, cola, water, soy milk), the inventory amount (beer 2, cola 1, water 1, soy milk 1), and the inventory change amount (beer+2, cola+1, water+1, and soymilk+1) at time t1. Using the data, the processor may generate first reception/release data 1201 during the T time of the first period (S1040). Thereafter, as new data is input over time, the processor 180 may remove temporary reception/release data.

This will be described below.

After the first reception/release data is generated, the internal image data of the refrigerator at times t2, t3, and t4 may be obtained during the T time of the second period.

At time t2, the recognized product list may be (beer, beer, cola, water, soy milk, soy milk, soy milk), and the inventory amount may be (beer 2, cola 1, water 1, soy milk 3).

In addition, at time t3, the recognized product list may be (beer, beer, cola, water, soy milk, soy milk, soy milk), and the inventory amount may be (beer 2, cola 1, water 1, soy milk 3).

In addition, at time t4, the recognized product list may be (beer, beer, cola, soy milk, soy milk, soy milk) and the inventory amount may be (beer 2, cola 1, water 0, soy milk 3).

The processor 180 may obtain the product list and inventory amount at times t2 to t4 during the T time of the second period and calculate the inventory change amount.

That is, the processor 180 may generate the second reception/release data 1202 during the T time of the second period (S1040).

At this time, the processor 180 may correct the reception/release data generated based on the product list and inventory information before the current time and the product list and inventory information after the current time (S1050).

Specifically, if the product list and inventory information before the current time and the product list and inventory information after the current time are the same, the processor 180 may maintain the product list and inventory information at the current time the same as before or after the current time.

For example, the time t4 will be described. The processor according to the embodiment of the present disclosure may obtain product list and inventory information at time t3, which is before the current time t4, and t5, which is after the current time, in order to detect temporary reception/release data.

Although the inventory change amount of 'water' is '−1' at time t4, when comparing the product list and the inventory information at time t3, which is before time t4, and t5, which is after time t4, the processor 180 may detect that the inventory related to 'water' is equal to '1'.

In this case, the processor 180 may determine that temporary reception/release occurs in the refrigerator and keep the inventory information of 'water' at time t4 the same as t3 or t5.

Therefore, the inventory change amount during the second T time may be (beer+0, cola+0, water+0, soy milk+2). Using the data, the processor may correct the second reception/release data 1202 for the T time.

After the second reception/release data 1202 is corrected, the internal image data of the refrigerator at times t5 and t6 may be obtained during the T time of the third period.

According to the embodiment of the present disclosure, at time t5, the recognized product list may be (beer, beer, cola, water, soy milk, soy milk), and the inventory amount may be (2 beer, 1 cola, 1 water, 2 soy milk).

In addition, at time t6, the recognized product list may be (beer, cola, soy milk), and the inventory amount may be (beer 2, cola 1, soy milk 3).

Using the data, the processor may generate third reception/release data 1203 for the T time.

The processor 180 may obtain the product list and inventory amount at time t5 to t6 during the third T time, calculate the inventory change amount, and correct the third reception/release data 1203 generated accordingly.

As explained earlier, although the inventory change amount of 'water' is '−1' at time t6, when comparing the product list and the inventory information at time t5, which is before time t6, and t7, which is after time t6, the processor may detect that the inventory related to 'water' is equal to '1'.

In this case, the processor 180 may determine that temporary release occurs in the refrigerator and keep the inventory information related to 'water' at time t6 the same as t5 or t7.

In addition, although the inventory change amount of 'soy milk' is '+1' at time t6, when comparing the product list and the inventory information at time t5, which is before time t6, and t7, which is after time t6, the processor may detect that the inventory related to 'water' is equal to '1'.

In this case, the processor 180 may determine that temporary reception occurs in the refrigerator and keep the inventory information of 'soy milk' at time t6 the same as t5 or t7.

Therefore, the inventory change amount during the third T time may be (beer+0, cola+0, water+0, soy milk−1). Using the data, the processor may correct the third reception/release data 1203 for the third T time.

Likewise, after the third reception/release data 1203 is generated, the internal image data of the refrigerator at time t7 may be obtained during the T time of the fourth period.

According to the embodiment of the present disclosure, at time t7, the recognized product list may be (beer, water, soy milk, soy milk), and the inventory amount may be (beer 1, water 1, soy milk 2).

Using the data, the processor may generate fourth reception/release data 1204 during the T time of the fourth period.

The processor according to the embodiment of the present disclosure may repeat the above process in real time, remove temporary reception/release data, and generate final reception/release data (S650).

Meanwhile, the final reception/release data 1200 in FIG. 12 is only an example for explaining an embodiment of the present disclosure in real time, and is not limited to the above example.

In addition, upon determining whether it is temporary reception/release data, the processor according to the embodiment of the present disclosure may determine whether it is temporary reception/release data based on consumption characteristics for each food category.

For example, the processor may obtain a temporary reception/release product list in advance, such as various sauces, water, beverages, and spices, and determine temporary reception/release only for products corresponding to the obtained temporary reception/release product list.

FIG. 6 will be described again.

After generating the final product reception/release data (S650), the processor according to the embodiment of the present disclosure may build a user database using the generated product reception/release data (S660).

At this time, as described above, the user database may include information on products inside the refrigerator, inventory amount, and inventory change amount over time.

Specifically, the processor 180 according to the embodiment of the present disclosure may use updated product inventory information to know that the second product has been released together with the first product at a specific time and a specific schedule.

Accordingly, the processor 180 may know that the first product and the second product are consumed together, and create a personalized database for the user accordingly.

The created user database may be stored in the memory. In addition, the created user database may be transmitted and utilized to and in various devices such as external devices, mobile terminals, and servers.

Meanwhile, although the embodiment of the present disclosure has been described as being performed by the processor of the refrigerator, the internal image data of the refrigerator obtained by a specific command of the refrigerator or mobile terminal is collected in the server, and the processor provided in the server performs the above process to create a database and transmit the created database to the refrigerator, the external device, the mobile terminal, etc.

Hereinafter, examples of using the database according to the embodiment of the present disclosure will be described with reference to FIGS. 13 to 15.

Figure 13:
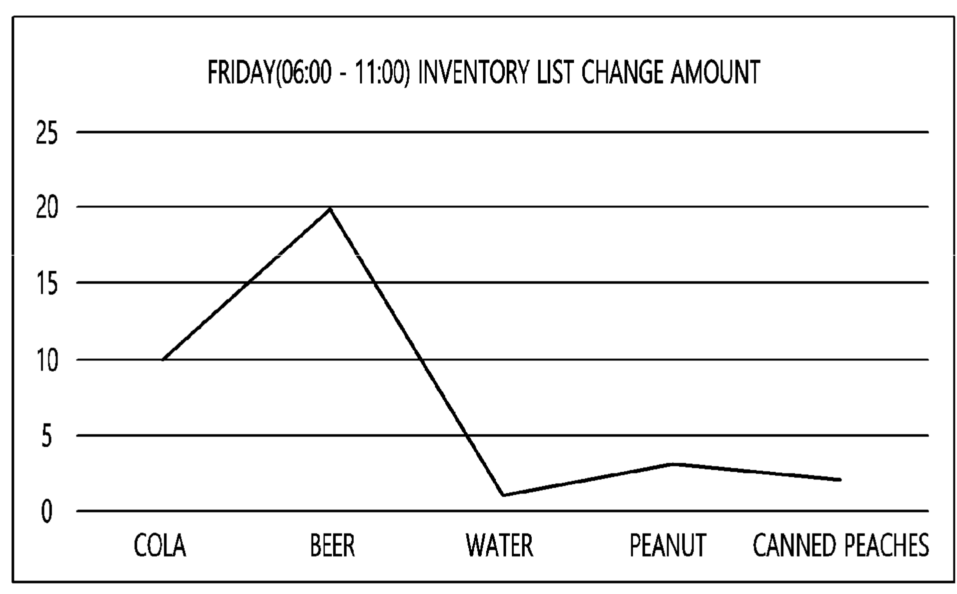
FIG. 13 is a diagram illustrating an example of a database according to an embodiment of the present disclosure.
Figure 14:
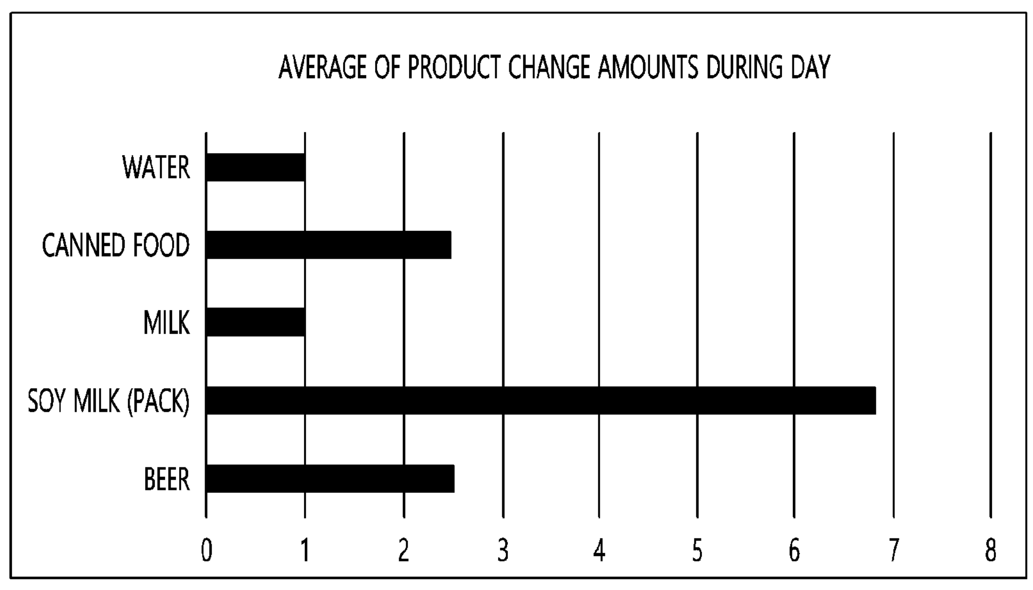
FIG. 14 is a diagram illustrating an example of a database according to an embodiment of the present disclosure.
Figure 15:
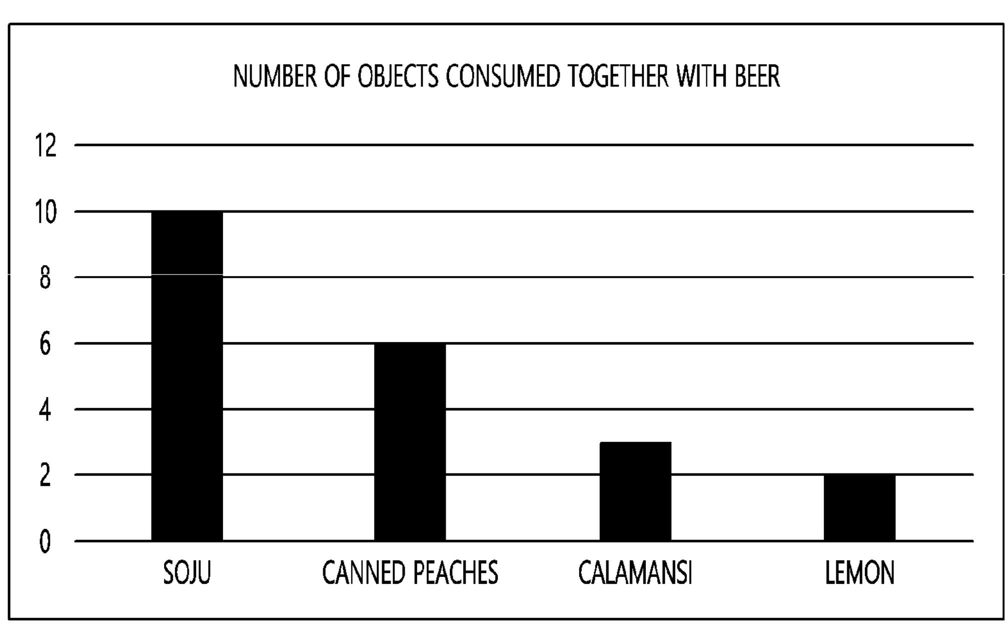
FIG. 15 is a diagram illustrating an example of a database according to an embodiment of the present disclosure.

FIG. 13 is an example diagram showing an inventory list change amount of a product according to an embodiment of the present disclosure, FIG. 14 is an example diagram showing an average of product change amounts according to an embodiment of the present disclosure, and FIG. 15 is an example diagram showing product consumption information according to an embodiment of the present disclosure.

Referring to FIG. 13, the processor 180 may generate an inventory list change amount for a specific day of the week.

Specifically, the database may include time data containing information about products being received or released for each product usage time (month/day/day of the week/hour), recommendation of food which needs to be purchased by day of the week or hour, and distribution data containing information on the consumption cycle of the food, product data containing information on products that are received/released at the same time as a specific food, preferred recipes, preferred food combinations, and nutrients/vitamins consumed.

In addition, it will be possible to provide a service that recommends specific products by identifying products that are widely consumed at specific times.

Referring to FIG. 14, shopping information may be generated including information about products that are released together among products released from the refrigerator.

Referring to FIG. 15, the processor according to the embodiment of the present disclosure may use updated product inventory information to determine that the second product has been released together with the first product at a specific time and a specific schedule.

Accordingly, the processor may know that the first product and the second product are consumed together, and may create a user's personalized database accordingly. In addition, it will be possible to provide recommended shopping information by providing the database to other devices.

For example, through the product recognition function in the refrigerator used by the user, product data accumulation and inventory list update may be performed based on the internal image data of the refrigerator captured after opening or closing the door or running (refreshing) the application through a mobile terminal.

The present disclosure described above can be implemented as computer-readable code on a medium in which a program is recorded. The computer-readable medium includes all kinds of recording devices in which data readable by a computer system is stored. Examples of computer-readable media include a Hard Disk Drive (HDD), a Solid State Disk (SSD), a Silicon Disk Drive (SDD), a ROM, a RAM, a CD-ROM, a magnetic tape, a floppy disk, an optical data storage device, etc. In addition, the computer may include the processor 180 of the terminal.

The invention claimed is:

1. A method of managing product reception/release data of a refrigerator, the method comprising:

obtaining internal image data of the refrigerator using a camera provided in the refrigerator;

extracting high-reliability data from the internal image data of the refrigerator;

updating product reception/release data based on the high-reliability data;

creating a user database based on the updated product reception/release data; and generating final product reception/release data by removing temporary reception/release data from the updated product reception/release data, via a processor, wherein the extracting the high-reliability data from the internal image data of the refrigerator comprises at least removing product covering data, wherein the removing of the product covering data comprises:

detecting a new product region;

extracting intersection region information of the new product region and an existing product region; and when intersection region information is larger than a preset value, determining reception/release of an existing product using a similarity between a region other than the intersection region of the existing product region and a region corresponding to the region other than the intersection region of the existing product region before a new product is received, when a size of the new product region is smaller than that of the existing product region, and wherein the determining of the reception/release of the existing product using the similarity comprises:

maintaining a reception status of the existing product when the similarity is larger than a preset value, and determining that the existing product is released when the similarity is equal to or less than the preset value.

2. The method of claim 1, wherein the obtaining of the internal image data of the refrigerator using the camera provided in the refrigerator comprises:

obtaining the internal image data of the refrigerator using the camera in response to when a shooting command is received from an external device or in response to when a refrigerator door is opened or closed.

3. The method of claim 1, wherein the extracting of the high-reliability data from the internal image data of the refrigerator further comprises at least removing low-quality data from the internal image data of the refrigerator, and wherein the low-quality data comprises image data obtained when a value of at least one of a speed sensor of the refrigerator, an illuminance sensor of the refrigerator and a degree of blur of the internal image data of the refrigerator exceeds a preset criterion.

4. The method of claim 1, wherein the extracting of the high-reliability data from the internal image data of the refrigerator further comprises at least removing low confidence data from the internal image data of the refrigerator, via a processor, and wherein the removing of the low confidence data comprises determining that unspecified data is the low confidence data when a similarity of a recognized product is lower than a preset value through comparison with existing data.

5. The method of claim 1, wherein the removing the product covering data further comprises:

detecting a new product;

extracting intersection region information of the new product and an existing product; and if the intersection region information is larger than a preset value, maintaining a reception status of the existing product and determining that the new product is received when a size of the new product is larger than that of the existing product.

6. The method of claim 1, wherein the removing of the product covering data further comprises:

detecting a new product;

extracting an intersection region of the new product and an existing product; and excluding the intersection region information from the product covering data when the intersection region information is equal to or less than a preset value.

7. The method of claim 1, wherein the generating of the final product reception/release data by removing the temporary reception/release data of the updated product reception/release data comprises:

generating a product list included in images taken at at least one specific time using the high-reliability data and shooting time information;

grouping the product list at the at least one specific time into a certain period;

generating reception/release data using the grouped product list; and correcting the generated reception/release data.

8. The method of claim 7, wherein the correcting of the generated reception/release data comprises maintaining the product list and an inventory list at a current time the same as before or after the current time, when the product list and inventory information before the current time and the product list and the inventory information after the current time are the same.

9. The method of claim 7, wherein the correcting of the generated reception/release data further comprises determining whether a product is included in a temporary reception/release product list.

10. The method of claim 1, further comprising:

generating an inventory list change amount of a product, an average of product change amounts and product consumption information using the user database; and providing a user-customized shopping information using the generated information.

11. A refrigerator comprising:

a communication unit;

a memory configured to store product reception/release data of at least one product in the refrigerator;

a camera configured to obtain internal image data of the refrigerator; and a processor configured to extract high-reliability data from the internal image data of the refrigerator, update the product reception/release data based on the high-reliability data and create a user database based on the updated product reception/release data, wherein the processor is further configured to generate final product reception/release data by removing temporary reception/release data from the updated product reception/release data, via a processor, wherein the extracting the high-reliability data from the internal image data of the refrigerator comprises at least removing product covering data, wherein the removing of the product covering data comprises:

detecting a new product region;

extracting intersection region information of the new product region and an existing product region; and when intersection region information is larger than a preset value, determining reception/release of an existing product using a similarity between a region other than the intersection region of the existing product region and a region corresponding to the region other than the intersection region of the existing product region before a new product is received, when a size of the new product region is smaller than that of the existing product region, and wherein the determining of the reception/release of the existing product using the similarity comprises:

maintaining a reception status of the existing product when the similarity is larger than a preset value, and determining that the existing product is released when the similarity is equal to or less than the preset value.

12. The refrigerator of claim 11, wherein the processor is configured to communicate with an external device through the communication unit and obtain the internal image data of the refrigerator using the camera when a shooting command is received from the external device or when a refrigerator door is opened or closed.

13. The refrigerator of claim 11, wherein the processor is further configured to extract the high-reliability data by performing at least one of removing low-quality data from the internal image data of the refrigerator and removing low confidence from the internal image data of the refrigerator.

14. A product reception/release management system comprising:

a refrigerator; and a server communicating with the refrigerator, wherein the refrigerator comprises a communication unit, a memory configured to store reception/release data, a camera configured to obtain internal image data of the refrigerator; and a processor, wherein the server comprises:

a communication unit configured to communicate with the refrigerator; and a processor configured to obtain the internal image data of the refrigerator through the communication unit and create a user database, wherein the processor of the server is configured to extract high-reliability data from the internal image data of the refrigerator, update product reception/release data based on the high-reliability data and create a refrigerator reception/release database based on the updated product reception/release data, and wherein the processor is further configured to generate final product reception/release data by removing temporary reception/release data from the updated product reception/release data, via a processor, wherein the extracting the high-reliability data from the internal image data of the refrigerator comprises at least removing product covering data, wherein the removing of the product covering data comprises:

detecting a new product region;

extracting intersection region information of the new product region and an existing product region; and when intersection region information is larger than a preset value, determining reception/release of an existing product using a similarity between a region other than the intersection region of the existing product region and a region corresponding to the region other than the intersection region of the existing product region before a new product is received, when a size of the new product region is smaller than that of the existing product region, and wherein the determining of the reception/release of the existing product using the similarity comprises:

maintaining a reception status of the existing product when the similarity is larger than a preset value, and determining that the existing product is released when the similarity is equal to or less than the preset value.

15. The product reception/release management system of claim 14, wherein the processor of the server is further configured to perform at least one of removing low-quality data from the internal image data of the refrigerator and removing low confidence data from the internal image data of the refrigerator to extract the high-reliability data, update product reception/release data based on the high-reliability data and remove temporary reception/release data from the updated product reception/release data to generate final product reception/release data.

16. The method of claim 1, wherein the temporary reception/release data of the updated product reception/release data comprises a list of one or more products removed from the refrigerator and restored to the refrigerator within a specific time period.

* * * * *